(12) United States Patent
Senior (10) Patent No.: US 6,613,290 B1
(45) Date of Patent: Sep. 2, 2003

(54) SYSTEM FOR FLUIDIZED CATALYTIC CRACKING OF HYDROCARBON MOLECULES

(75) Inventor: Richard C. Senior, Naperville, IL (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 123 days.

(21) Appl. No.: 09/616,448

(22) Filed: Jul. 14, 2000

(51) Int. Cl.⁷ .................. B01J 8/18; F27B 15/08; G10G 11/18
(52) U.S. Cl. .................. 422/140; 422/139; 422/145; 422/214; 422/215; 422/224
(58) Field of Search .................. 422/139–145, 422/215, 214, 224, 228

(56) References Cited

U.S. PATENT DOCUMENTS

| 4,523,987 A | 6/1985 | Penick | 208/157 |
|---|---|---|---|
| 4,578,183 A | 3/1986 | Chou et al. | 208/113 |
| 4,753,780 A | 6/1988 | Bowen | 422/214 |
| 4,883,583 A | 11/1989 | Mauléon et al. | 208/113 |
| 5,139,748 A | 8/1992 | Lomas et al. | 422/140 |
| 5,318,691 A | 6/1994 | Muldowney | 208/113 |
| 5,338,438 A | 8/1994 | Demoulin et al. | 208/153 |
| 5,348,644 A | 9/1994 | Maroy et al. | 208/153 |
| 5,554,341 A | 9/1996 | Wells et al. | 422/145 |
| 5,622,677 A | 4/1997 | Hadjigeorge | 422/144 |
| 5,705,130 A | 1/1998 | Hedrick | 422/145 |
| 5,851,380 A | 12/1998 | Wells | 208/158 |

FOREIGN PATENT DOCUMENTS

| EP | 0832956 | 4/1998 | C10G/11/18 |
|---|---|---|---|
| EP | 0911379 | 4/1999 | C10G/11/18 |
| WO | WO98/12279 | 3/1998 | C10G/11/18 |

*Primary Examiner*—Hien Tran
(74) *Attorney, Agent, or Firm*—Paul E. Purwin; Jeremy J. Kliebert (57) ABSTRACT

A fluidized catalytic cracking system includes a riser for contacting catalyst and hydrocarbon feedstock. The riser has an inner surface that defines a central passage. The central passage acts as a flow path for the catalyst and the hydrocarbon feedstock. A plurality of ribs are disposed on the riser inner surface. The ribs increase the degree of mixing that occurs between the catalyst and the hydrocarbon feedstock within the central passage. In particular, each rib has a contoured inner wall. The contour of the inner wall forces a portion of the catalyst flow inward, toward the hydrocarbon-rich center of the central passage.

51 Claims, 9 Drawing Sheets

SYSTEM FOR FLUIDIZED CATALYTIC CRACKING OF HYDROCARBON MOLECULES

FIELD OF THE INVENTION

The invention relates generally to a system for cracking hydrocarbon molecules. More particularly, the invention provides a fluidized catalytic cracking system having a riser equipped with contoured ribs. The contoured ribs enhance mixing of the catalyst and the hydrocarbon feedstock that flow through the riser.

BACKGROUND OF THE INVENTION

The most common method for catalytic cracking presently in use in the oil refining industry is fluidized catalytic cracking (FCC). The FCC process is utilized to crack hydrocarbon materials such as oil. Cracking refers to the conversion of petroleum fractions having a high boiling point into products having a lower boiling point. The cracking process is usually performed in a vertically-oriented conduit, or riser, that forms part of an FCC system. Typically, hot catalyst particles in an aerated (fluidized) state are introduced into a bottom portion of the riser, and are induced to flow upward. A hydrocarbon feedstock is injected into the catalyst flow as the catalyst travels through the riser. The hydrocarbon feedstock, in general, is significantly cooler than the catalyst and rapidly vaporizes upon contact with the catalyst.

Optimal cracking conditions in an FCC process require a substantially immediate and homogenous mixing of the catalyst and the hydrocarbon feedstock. Such mixing is difficult to achieve, however, and stratified regions of hot catalyst and cold hydrocarbon feedstock typically appear within the catalyst-hydrocarbon flow. Over-cracking and thermal cracking of the hydrocarbon molecules typically occur in the catalyst-rich areas of the flow. Conversely, incomplete cracking of the hydrocarbon molecules usually occurs in hydrocarbon-rich flow regions. These factors can substantially reduce the overall yield of the FCC process. In addition, over-cracking, thermal cracking, and incomplete cracking have undesirable side-effects such as deactivation of the catalyst within the riser due to coke laydown, regeneration of the catalyst within the regenerator due to the combustion of air and residual coke, and the production of excessive amounts of lower-boiling-range gaseous reaction products, e.g., propane and butane gases. Hence, effective methods for mixing the catalyst and the hydrocarbon feedstock within the riser are critical to the cracking process.

Radial-feed-injection of hydrocarbon feedstock is a commonly-used technique for improving the mixing of catalyst and hydrocarbon feedstock in FCC systems. This technique involves the use of radial-feed atomizing nozzles positioned around the circumference of the riser. Steam is typically directed to the nozzles to assist in the atomization of the hydrocarbon feedstock. Radial-feed nozzles, in general, produce a more uniform spray pattern of hydrocarbon feedstock than other injection techniques. Common radial-feed nozzles form a flat, fan-shape spray jet that diverges at an angle within the range of approximately 40 to 65 degrees after leaving the atomizing nozzle (this angle is known as the "spray angle" of the nozzle). Spray angles above approximately 65 degrees increase the potential for the erosive spray jet to impinge on the inner surface of the riser.

Figure 8:
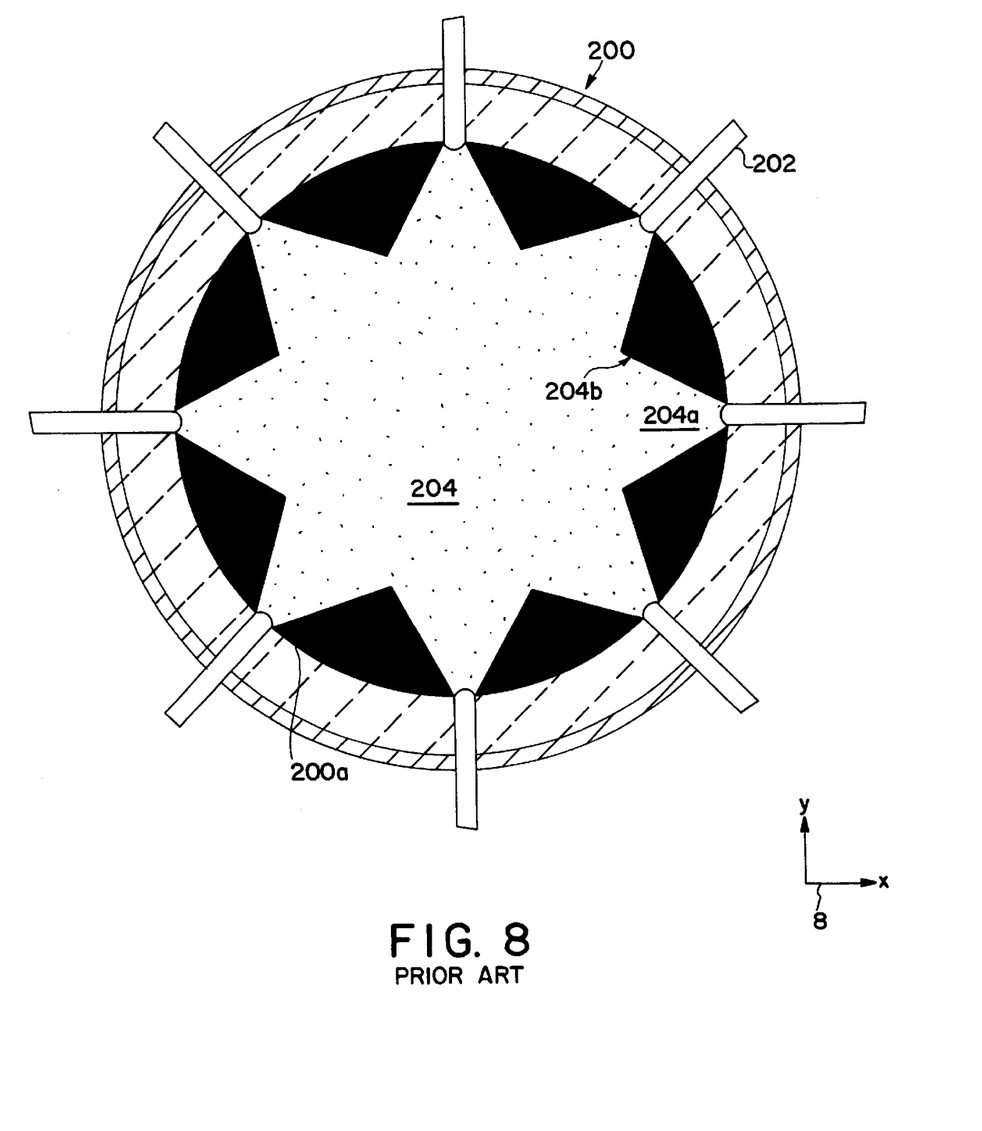
FIG. 8 illustrates a transverse cross section of a prior-art riser.

One of the drawbacks of radial-feed injection is the presence of gaps in the hydrocarbon spray pattern. In particular, the angled profile of the individual spray jets produces gaps in the spray pattern proximate the inner surface of the riser. This phenomenon is illustrated in FIG. 8. FIG. 8 is a cross-sectional view of a common riser 200 having an inner surface 200a. A plurality of radial-feed atomizing nozzles 202 are positioned around the circumference of the inner surface 202a. The nozzles each produce an individual spray jet 204a of hydrocarbon feedstock. The spray jets 204a collectively form a spray pattern 204 within the riser 200.

Figure 3:
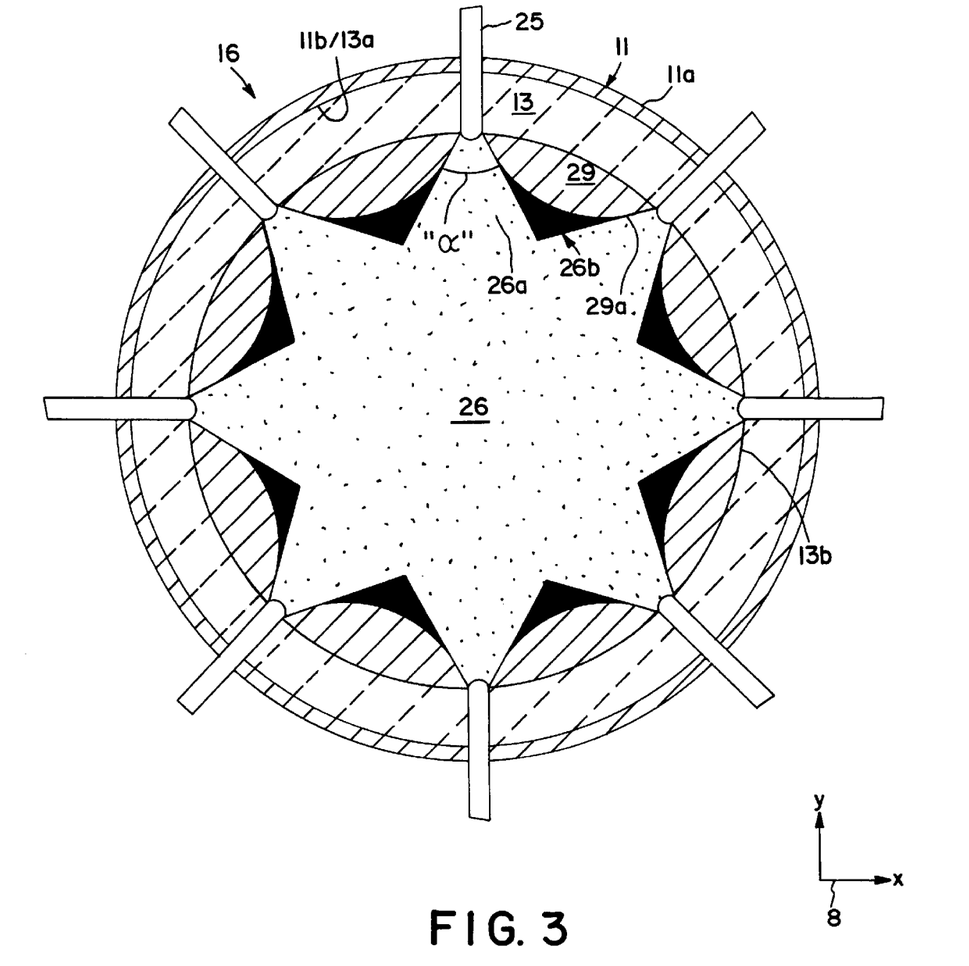
FIG. 3 illustrates a transverse cross-section of the riser shown in FIGS. 1 and 2 taken along the line A—A of FIG. 2.

A plurality of gaps 204b appear in the spray pattern 204, as shown in FIG. 3. The gaps 204b are a result of the fan-shaped profiles of the jets 204a, and the plug-flow nature of the catalyst as it travels upward through the spray region of the riser 200. The combined area of the gaps 204b can be as large as fifty percent or more of the cross-sectional area of the riser 200. Furthermore, the unmixed region of catalyst downstream of the gaps 204b can persist for twenty-five feet or more in the riser of a typical FCC system.

Various techniques for improving the mixing of catalyst and hydrocarbon feedstock in FCC systems have been developed. For example, the use of venturi tubes, draft tubes, and vortex mixing to disturb the catalyst flow near the point of injection of the hydrocarbon feedstock has been described in U.S. Pat. Nos. 4,523,987; 5,622,677; 4,578,183; and 5,318,691. Other mixing techniques include increasing the normally-occurring turbulence within the catalyst-hydrocarbon flow through the use of turbulence tips (U.S. Pat. No. 4,753,780) and kick-off rings (U.S. Pat. No. 5,851,380) affixed to the inner surface of the riser. Various other configurations, including feed-injection cone assemblies (U.S. Pat. No. 5,554,341) and arcuate mixing elements (European Pat. No. 832,956) have also been proposed. Furthermore, non-standard injection arrangements have been suggested in U.S. Pat. Nos. 5,139,748; 4,883,583; and 5,348,644, and in European Pat. No. 911,379.

The above-noted mixing techniques have not proven entirely effective in eliminating spray-pattern gaps such as the gaps 204b. Hence, a need currently exists for an FCC system comprising a riser having geometric features that eliminate such gaps, thereby achieving more effective mixing of catalyst and hydrocarbon feedstock within the riser.

SUMMARY OF THE INVENTION

An object of the present invention is to provide a fluidized catalytic cracking (FCC) system that effectively mixes a flow of catalyst and hydrocarbon feedstock. In accordance with the this object, a presently-preferred embodiment of the invention provides an FCC system comprising a riser. The riser has an outer surface and an inner surface. The inner surface defines a central passage that extends substantially along a longitudinal axis of the riser. The central passage is used to transport a hydrocarbon feedstock and a catalytic material.

The inner surface of the riser has an elongated rib disposed thereon for mixing the hydrocarbon feedstock and the catalytic material. The rib has an inner wall that faces the central passage. The rib has a thickness defined by a distance between the inner wall and the outer surface of the riser. The thickness of the rib varies along at least a portion of a length of the rib.

According to another aspect of the invention, a preferred embodiment of an FCC system comprises a riser having an outer surface and an inner surface. The inner surface defines a central passage extending substantially along a longitudinal axis of the riser. The FCC system also includes a plurality of atomizing nozzles coupled to the riser. The atomizing nozzles are adapted to inject a hydrocarbon feedstock into a flow of catalytic material within the central passage. The atomizing nozzles thereby form a spray pattern of the hydrocarbon feedstock within the central passage. The FCC system further comprises a plurality of elongated ribs disposed along the riser inner surface.

In accordance with a further aspect of the invention, a preferred embodiment of an FCC system comprises a riser having an outer surface and an inner surface. The inner surface defines a central passage extending substantially along a longitudinal axis of the riser. The central passage is used to transport a hydrocarbon feedstock and a catalytic material.

The FCC system further comprises an elongated rib disposed along the riser inner surface. The rib is used to mix the hydrocarbon feedstock and the catalytic material. The rib is contoured so that a radial distance between the rib and the longitudinal axis of the riser varies along at least a portion of a length of the rib.

BRIEF DESCRIPTION OF THE DRAWINGS

The foregoing summary, as well as the following detailed description of a presently-preferred embodiment, is better understood when read in conjunction with the appended drawings. For the purpose of illustrating the invention, the drawings show an embodiment that is presently preferred. The invention is not limited, however, to the specific instrumentalities disclosed in the drawings. In the drawings.

DESCRIPTION OF THE PREFERRED EMBODIMENTS

A presently-preferred embodiment of the invention is shown in FIGS. 1 through 4B. The figures are each referenced to a common coordinate system 8 denoted in each illustration. The invention provides a fluidized catalytic cracking (FCC) system 10. The FCC system 10 includes a reactor 12, a regenerator 14, and a riser 16 (see FIG. 1).

The riser 16 is an elongated conduit comprising a metallic out-wall 11 and a liner 13. The out-wall 11 has an outer circumferential surface 11a and an inner circumferential surface 11b. The liner 13 has an outer circumferential surface 13a and an inner circumferential surface 13b. The liner 13 is disposed within the out-wall 11. More particularly, the outer circumferential surface 13a of the liner 13 is anchored to the inner circumferential surface 11b of the out-wall 11. The liner 13 is preferably formed from a refractory material. The refractory material may be any material that suitably protects the out-wall 11 from the erosive and thermal effects of the flow within the riser 16 (discussed below). Such refractory materials are commonly known to those skilled in the art of fluidized catalytic cracking of hydrocarbons. Further details concerning the liner 13 are presented below.

The inner circumferential surface 13b of the liner 13 defines a central passage 17. The central passage 17 extends substantially along a longitudinal centerline Cl of the riser 16 (see FIGS. 1 and 2). The central passage 17 includes a lift zone 17a located proximate the bottom of the riser 16. The central passage 17 also includes a feed-injection zone 17b that adjoins the lift zone 17a, and a reaction zone 17c that adjoins the feed-injection zone 17b. Hot regenerated catalyst is introduced into the lift zone 17a. The catalyst is routed to the lift zone 17a via a standpipe 18. The flow-rate of the catalyst is controlled by a valve 20. (Terms such as "top," "bottom," "upper," "lower," "above," "below," etc., as appearing throughout the specification and claims, are used with reference to the component orientations depicted in FIGS. 1 and 2. These terms are used for illustrative purposes only, and are not intended to be otherwise limiting.)

A gaseous fluid such as steam or methane-rich light hydrocarbon gas is routed to the lift zone 17a via a line 22. The gaseous fluid is introduced into the lift zone 17a by a distributor 24 located proximate the bottom of the lift zone 17a. The gaseous fluid propels (drags) the catalyst particles upward within the central passage 17, i.e., the gaseous fluid induces the catalyst to flow primarily in the direction indicated by an arrow 45 in FIGS. 1 and 2.

The FCC system 10 includes eight atomizing nozzles 25. The atomizing nozzles 25 are radial-feed nozzles of the type commonly known to those skilled in the art of fluidized catalytic cracking. The atomizing nozzles 25 mounted on the riser 16. More particularly, the atomizing nozzles 25 are circumferentially spaced within a common horizontal plane, and are mounted on the riser 16 so that a tip of each nozzle 25 is substantially flush with the inner circumferential surface 13b of the liner 13 (see FIGS. 2 and 3). (The number and type of atomizing nozzles 25 in the exemplary embodiment are specified for illustrative purposes only; the invention can be used in conjunction with embodiments that utilize different types and quantities of the atomizing nozzles 25. In addition, the atomizing nozzles 25 can be arranged in two or more vertically-disposed planes.)

The atomizing nozzles 25 inject hydrocarbon feedstock 23 into the feed-injection zone 17b. The atomizing nozzles 25 discharge the hydrocarbon feedstock in the direction denoted by the arrow 54 in FIG. 2. Each nozzle 25 produces a fan-shaped jet 26a, as shown in FIG. 3. Each jet 26a forms a spray angle denoted by the symbol "α" in FIG. 3. The spray angle α is preferably within the range of approximately forty to sixty-five degrees in the exemplary embodiment. Furthermore, the nozzles 25 preferably inject the hydrocarbon feedstock at an angle within the range of approximately thirty to sixty degrees in relation to the horizontal, i.e., in relation to the x-y plane. This angle is denoted by the symbol "γ" in FIG. 2. (Specific values for the angles α and γ are presented for exemplary purposes only; the invention can be used in conjunction with atomizing nozzles 25 that produce substantially different values for α and γ. For example, nozzles 25 that produce spray patterns having an γ value as low as minus sixty (−60) degrees may also be utilized, i.e., the nozzles 25 can be pointed downward at an angle as great as sixty degrees in relation to the horizontal.)

The individual jets 26a collectively form a spray pattern 26 of hydrocarbon feedstock within the central passage 17 (see FIG. 3). The spray pattern 26 is substantially continuous (on a time-averaged basis) proximate the center of the passage 17. The spray pattern 26 is broken, i.e., non-continuous, proximate the inner circumferential surface 13b of the liner 13. Specifically, the fan-shaped profile of the jets 26a produces a series of gaps 26b between the spray pattern 26 and the inner circumferential surface 13b, as shown in FIG. 3. The gaps 26b extend radially inward from the inner circumferential surface 13b, toward the center of the passage 17. The fan-shaped geometry of the jets 26a causes the gaps 26b to progressively narrow as the gaps 26b extend inward. Each gap 26b extends inward until reaching a point where the jets 26a of adjacent nozzles 25 converge.

Figure 1:
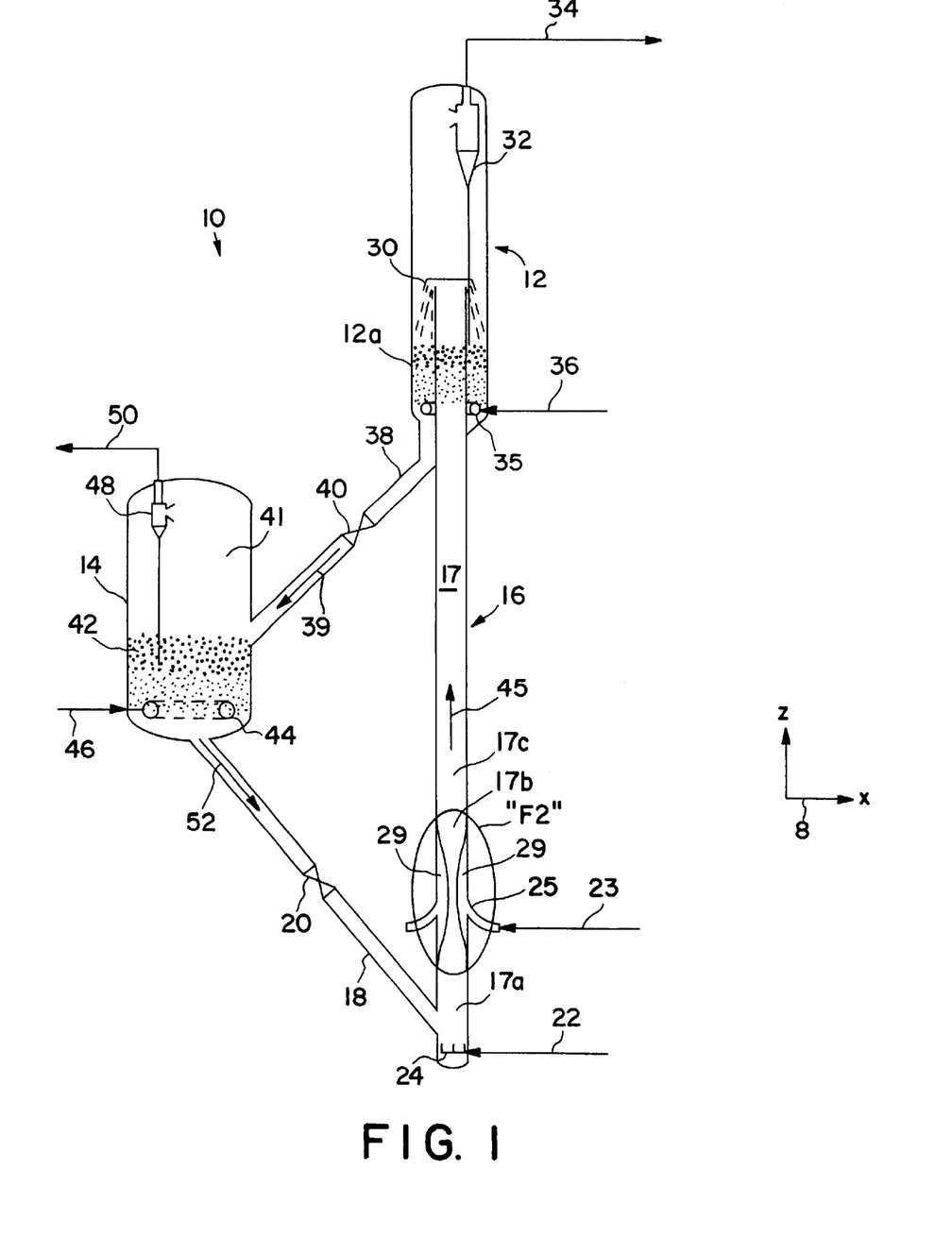
FIG. 1 is a diagrammatic illustration of an FCC system in accordance with the present invention.
Figure 2:
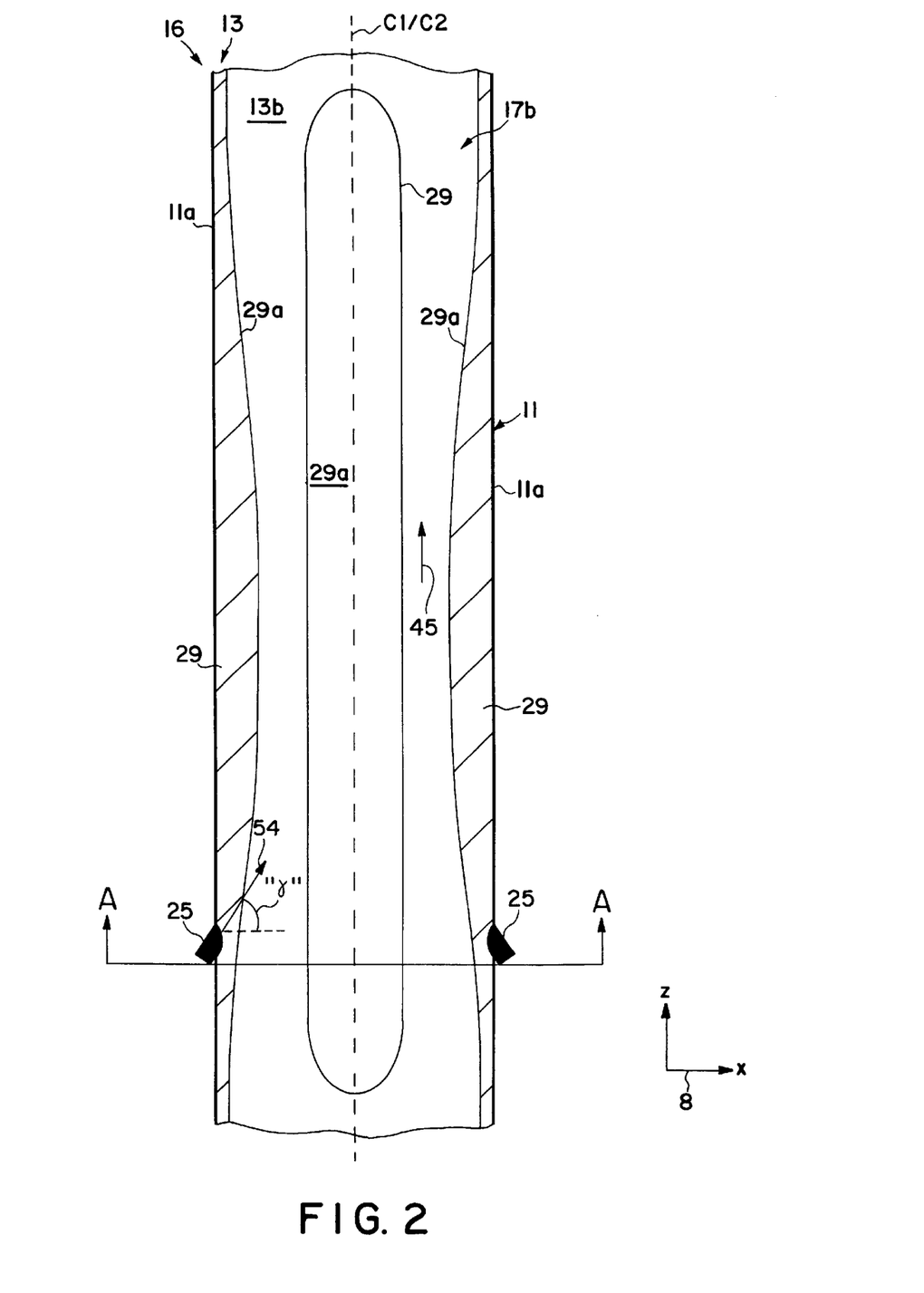
FIG. 2 illustrates a longitudinal cross-section of a riser shown in the area designated "F2" in FIG. 1.

In accordance with the present invention, a plurality of mixing ribs 29 are formed along the inner circumferential surface 13b of the liner 13, proximate the atomizing nozzles 25 (see FIGS. 1 through 3). The number of mixing ribs 29 preferably equals the number of atomizing nozzles 25. Hence, the exemplary embodiment preferably includes a total of eight mixing ribs 29. The ribs 29 promote mixing of the regenerated catalyst and the hydrocarbon feedstock within the feed-injection zone 17b. An in-depth description of the structure and function of the mixing ribs 29 is presented below. (For clarity, several of the ribs 29 that would otherwise be visible in the cross-sectional view of FIG. 2 are not shown. All of the ribs 29 utilized in the riser 16 are depicted in FIG. 3.)

The mixing of the regenerated catalyst and the hydrocarbon feedstock in the feed-injection zone 17b produces a fluidized bed of catalyst particles and hydrocarbon molecules. The fluidized bed flows into the reaction zone 17c upon exiting the feed-injection zone 17b. The catalytic particles are contacted with the hydrocarbon molecules primarily in the reaction zone 17c. This contacting gives rise to a chemical reaction that cracks the hydrocarbon molecules. The total residence time of the hydrocarbon molecules in the riser 16 is preferably within the range of approximately 1.0 to 3.0 seconds. More preferably, the residence time is within the range of approximately 1.5 to 2.2 seconds. Most preferably, the residence time is within the range of approximately 1.75 to 2.0 seconds. This residence time provides the hydrocarbons with a superficial velocity within the range of approximately forty to seventy feet per second (superficial velocity represents the quotient of the volumetric flow rate of the hydrocarbon molecules and the cross-sectional area of the passage 17).

The fluidized bed of catalyst and hydrocarbon molecules is discharged from the riser 16 into the reactor 12. The reactor 12 includes a ballistic separator 30 (see FIG. 1). The ballistic separator 30 separates the gaseous effluents in the fluidized bed from the deactivated, coke-impregnated catalyst particles. The reactor 12 also includes a cyclonic separator 32 located proximate the top of the reactor 12. The cyclonic separator 32 further separates the catalyst particles from the hydrocarbon products. The gaseous effluents produced by the separation process (including the cracked hydrocarbon molecules) flow out of the reactor 12 via a line 34 located at the top of the cyclonic separator 32. (Alternatively, the gaseous effluents and the catalyst particles may be separated by cyclonic inertial separation at the top of the riser 16.)

The catalyst particles separated in the above-noted manner drop to a lower portion 12a of the reactor 12 (the portion 12a is commonly referred to as a "catalyst stripper"). A stripping gas, e.g., steam, is introduced into the lower portion 12a via a line 36 and a stripping-gas distributor 35. The stripping gas further separates residual hydrocarbon material from the catalyst particles. The catalyst particles subsequently flow to the regenerator 14 via a line 38, as indicated by the arrow 39 shown in FIG. 1. The flow rate of the catalyst particles is controlled by a valve 40 within the line 38.

The regenerator 14 includes a regeneration chamber 41. An oxidizing gas, e.g., air, is routed to the regeneration chamber 41 by a line 46. The oxidizing gas is introduced into the chamber 41 via an air-distributor 44. The deactivated, coke-impregnated catalyst particles are simultaneously introduced into the chamber 41 via the line 38. The catalyst particles and the oxidizing gas form a fluidized bed 42. The catalytic particles are regenerated by combusting the coke within the fluidized bed. Combustion of the coke and any entrained hydrocarbon material still present on or within the catalyst particles restores the catalyst activity. Catalyst particles entrained with the resulting combustion-product gases are subsequently separated by a cyclonic separator 48 and returned to the fluidized bed. The combustion gases exit the regeneration chamber 41 via a line 50. The regenerated catalyst, which has been heated by the combustion process, exits the regeneration chamber 41 and is routed to the riser 16 via the standpipe 18 (see the arrow 52 in FIG. 1).

Structural details of a preferred embodiment of the mixing ribs 29 are as follows. The mixing ribs 29 are most clearly shown in FIGS. 4A and 4B. Each rib 29 has an inner wall 29a that faces the passage 17. This arrangement is most clearly shown in FIG. 2. The ribs 29 of the exemplary embodiment are oriented so that a longitudinal axis C2 of each rib 29 is substantially parallel to the axis C1 of the riser 16 (see FIG. 2).

Figure 4A:
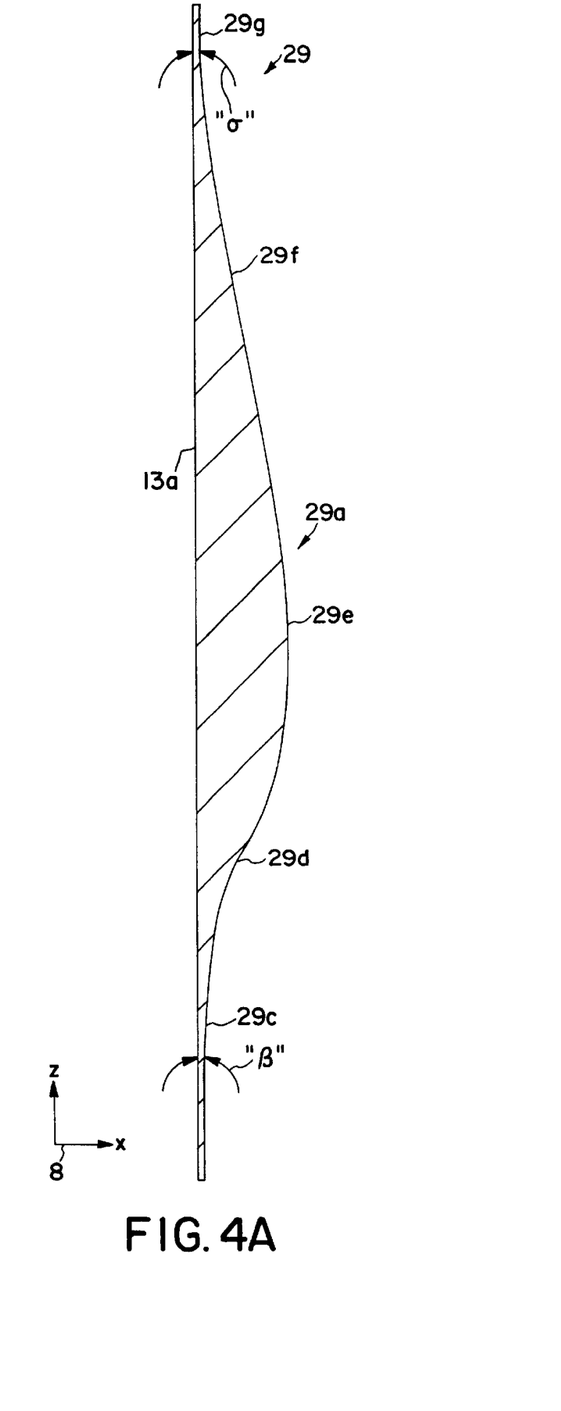
FIG. 4A illustrates a longitudinal cross-section of a rib for use in the riser shown in FIGS. 1 through 3.
Figure 4B:
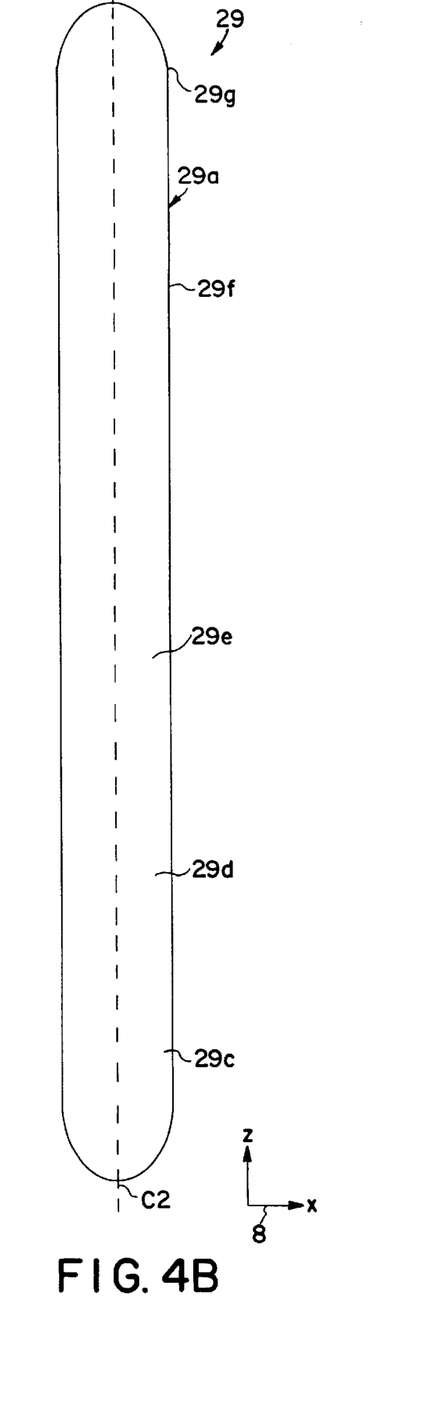
FIG. 4B is a front view of the rib shown in FIG. 4A.

The inner wall 29a of each rib 29 has a preferred profile shown most clearly in FIGS. 2 and 4A. The inner wall 29a is contoured in a manner that causes a portion of the catalyst flow within the central passage 17 to flow inward, toward the centerline C1. The inner walls 29a give the central passage 17 the cross-sectional profile shown in FIG. 2. This feature enhances the mixing of the hydrocarbon feedstock and the catalyst within the central passage 17, as explained in detail below. (Diametrically-opposed ribs 29 are depicted in the figures for illustrative purposes only; embodiments in which the ribs 29 are not arranged in this manner are also within the contemplated scope of the invention.)

Further details regarding the profile of the inner wall 29a are as follows. Referring to FIG. 4A, the inner wall 29a has a first inclined portion 29c and an adjoining first concave portion 29d (the various slopes and contours of the inner wall 29a have been exaggerated in FIG. 4A for clarity). The inner wall 29a also includes a convex portion 29e that adjoins the first concave portion 29d, and a second concave portion 29f that adjoins the convex portion 29e. The inner wall 29a further includes a second inclined portion 29g that adjoins the second concave portion 29f. (The terms "concave" and "convex," when appearing in this context throughout the specification and claims, are used in reference to the outer circumferential surface 13a of the liner 13.)

The first inclined portion 29c has a substantially straight longitudinal cross-section, as is shown most clearly in FIG.

4A. The longitudinal cross-section of the portion 29c forms an oblique angle in relation to the the outer circumferential surface 13a of the liner 13. This angle is denoted by the symbol "β" in FIG. 4A. The angled orientation of the inclined portion 29c causes the inner wall 29a to extend inward, toward the axis C1, in relation to the oncoming catalyst flow within the central passage 17.

The concave portion 29d causes the inner wall 29a to extend further inward in relation to the oncoming catalyst flow. More specifically, the curvilinear profile of the concave portion 29d gradually increases the rate at which the portion 29d extends inward along the direction of flow.

The convex profile of the convex portion 29e causes the rate at which the inner wall 29a extends inward to gradually decrease along the direction of catalyst flow. In addition, the convex profile of the portion 29e causes the portion 29e to begin extending away from the axis C1 as the convex portion 29e continues to extend in the direction of flow (see FIG. 4A).

The second inclined portion 29g has a substantially straight longitudinal cross-section (see FIG. 4A). The longitudinal cross-section of the portion 29g forms an oblique angle in relation to the outer circumferential surface 13a of the liner 13. This angle is denoted by the symbol "σ" in FIG. 4A. The profiles of the second inclined portion 29g and the second concave portion 29f cause the inner wall 29a to continue to extend away from the axis C1 in relation to the oncoming flow. The second concave portion 29f preferably has a radius (or radii) of curvature greater than the radius (or radii) of curvature of the first concave portion 29d, as is most clearly shown in FIG. 4A. This feature causes the distance between the second concave portion 29f and the outer circumferential surface 13a of the liner 13 to change at a more gradual rate than the distance between the first concave portion 29d and the outer circumferential surface 13a. The significance of this feature is explained below.

The inner wall 29a preferably has a substantially arcuate transverse cross-section as shown in FIG. 3. The functional significance of this feature is discussed below. Preferably, the ribs 29 are positioned so that a portion of each rib 29 is disposed between adjacent atomizing nozzles 25 (see FIGS. 2 and 3). Most preferably, each rib 29 is positioned so that the first concave portion 29d of the rib 29 is located proximate the point at which the adjacent atomizing nozzles 25 discharge into the central passage 17. The functional significance of this feature is discussed below.

Functional characteristics of the mixing ribs 29 are as follows. The mixing ribs 29 direct the flow of catalyst inward within the central passage 17. This action improves mixing between the catalyst and the hydrocarbon feedstock, as noted previously. More particularly, the ribs 29 direct the catalyst flow away from the spray-pattern gaps 26b and into the spray pattern 26. Hence, the ribs 29 cause a substantial entirety of the catalyst flow to be brought into contact with the hydrocarbon feedstock within the feed-injection zone 17b of the central passage 17.

The ribs 29 perform the above-noted mixing function as a result of the geometry of the rib inner walls 29a, and the relative positions of the ribs 29 and the atomizing nozzles 25. Specifically, the ribs 29 are located between adjacent atomizing nozzles 25, as previously described. Hence, the ribs 29 are radially aligned with the gaps 26b in the hydrocarbon spray pattern 26 (see FIG. 3). The contoured profile of the ribs 29 thus forces the catalyst within the gaps 26b inward, toward the spray pattern 26, as the catalyst flows through the feed-injection zone 17b. In other words, the rib inner walls 29a impart a radial velocity to the catalyst flow located within the 'spray-pattern gaps 26b. The radial velocity component urges the catalyst into the hydrocarbon spray pattern 26. This action causes a forced mixing of the catalyst and the hydrocarbon feedstock within the feed-injection zone 17b. Furthermore, the ribs 29 are vertically positioned so that the catalyst flow from the gaps 26b is directed into the hydrocarbon feedstock at about the point where the jets 26a have fully developed. This feature further enhances the mixing of the catalyst and hydrocarbon streams.

In addition, the inward extension of the portions 29c, 29d, and 29e of the inner wall 29a causes the cross-sectional area of the central passage 17 to decrease. This decrease causes a corresponding increase in the velocity of the flow within the feed-injection zone 17b. The velocity increase further enhances mixing of the catalyst and the hydrocarbon feedstock. Specifically, the velocity increase raises the level of turbulence in the catalyst-hydrocarbon flow, and thereby enhances mixing within the flow. Furthermore, the decreased cross-sectional area of the passage 17 reduces the horizontal (x and y-axis) distance that the hydrocarbon feedstock must travel in order to radially mix with the catalyst.

The geometric profile of the rib inner wall 29a inhibits flow separation from the inner wall 29a. In particular, the presence of the inclined portions 29c and 29g and the relatively shallow taper of the concave portion 29f reduces the tendency for the flow to separate from the inner wall 29a. (Flow separation has the undesirable effect of increasing the pressure drop in the flow within the passage 17; flow separation also increases erosion of the inner walls 29a of the ribs 29.)

The transverse cross-sectional profile of the ribs 29 further inhibits erosion of the inner walls 29a of the ribs 29. In particular, the rib inner walls 29a are shaped so as to prevent the jets 26a from impinging directly on the ribs 29. This feature is most clearly shown in FIG. 3. As is evident from the figure, the substantially arcuate cross-section of the inner wall 29a causes the inner walls 29a to remain within the spray-pattern gaps 26b. Hence, the erosive effects caused by direct impingement of the jets 26a on the rib walls 29a are avoided.

The present invention provides numerous advantages in relation to common FCC systems. For example, the enhanced mixing provided by the ribs 29 substantially improves the overall yield of the FCC process. In particular, the improved contacting of the catalyst and the hydrocarbon feedstock alleviates the over-cracking and thermal cracking that typically occur in catalyst-rich areas of the catalyst-hydrocarbon flow. Furthermore, the improved contacting alleviates the incomplete vaporization of the hydrocarbon feedstock that is characteristic of hydrocarbon-rich flow regions. In addition, the undesirable side-effects of incomplete mixing, e.g., deactivation of the catalyst within the riser 16 due to coke laydown, regeneration of the catalyst within the regenerator 14 due to the combustion of air and residual coke, and the production of excessive amounts of lower-boiling-range gaseous reaction products, are substantially reduced by the use of the mixing ribs 29.

The invention achieves the above-noted advantages without adding substantially to the overall cost or complexity of the FCC system 10. For example, the mixing ribs 29 contain no moving parts, and can be added to existing FCC systems at a relatively modest expense. Furthermore, the mixing ribs 29 function without the use of any support equipment, e.g., compressed-air or hydraulic systems. Also, the use of the ribs 29 requires no substantial expenditures of labor or money after the ribs 29 have been installed in the riser 16. Additionally, the ribs 29 produce minimal pressure losses in the catalyst-hydrocarbon flow, and are subject to minimal amounts of erosion due to the above-described characteristics of the inner wall 29a.

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of the parts, within the principles of the invention to the full extent indicated by the broad general meaning of the terms in which the appended claims are expressed.

For example, a preferred embodiment of the ribs 29 has been described in detail for illustrative purposes. Numerous variations in the geometric configuration of the ribs 29, and particularly in the shape of the inner walls 29a, are within the contemplated scope of the present invention. Furthermore, the riser 16 of the exemplary FCC system 10 is substantially straight, i.e., a substantial entirety of the riser 16 is vertically-oriented. FCC systems within the contemplated scope of the invention may comprise risers having portions that are not vertically-oriented (the ribs 29 would preferably be located in a lower, vertically-oriented portion of such risers). Also, the ribs 29 may be formed separately from the liner 13, i.e., the ribs 29 do not necessarily have to be formed as an integral part of the liner 13 as in the exemplary embodiment.

Figure 5A:
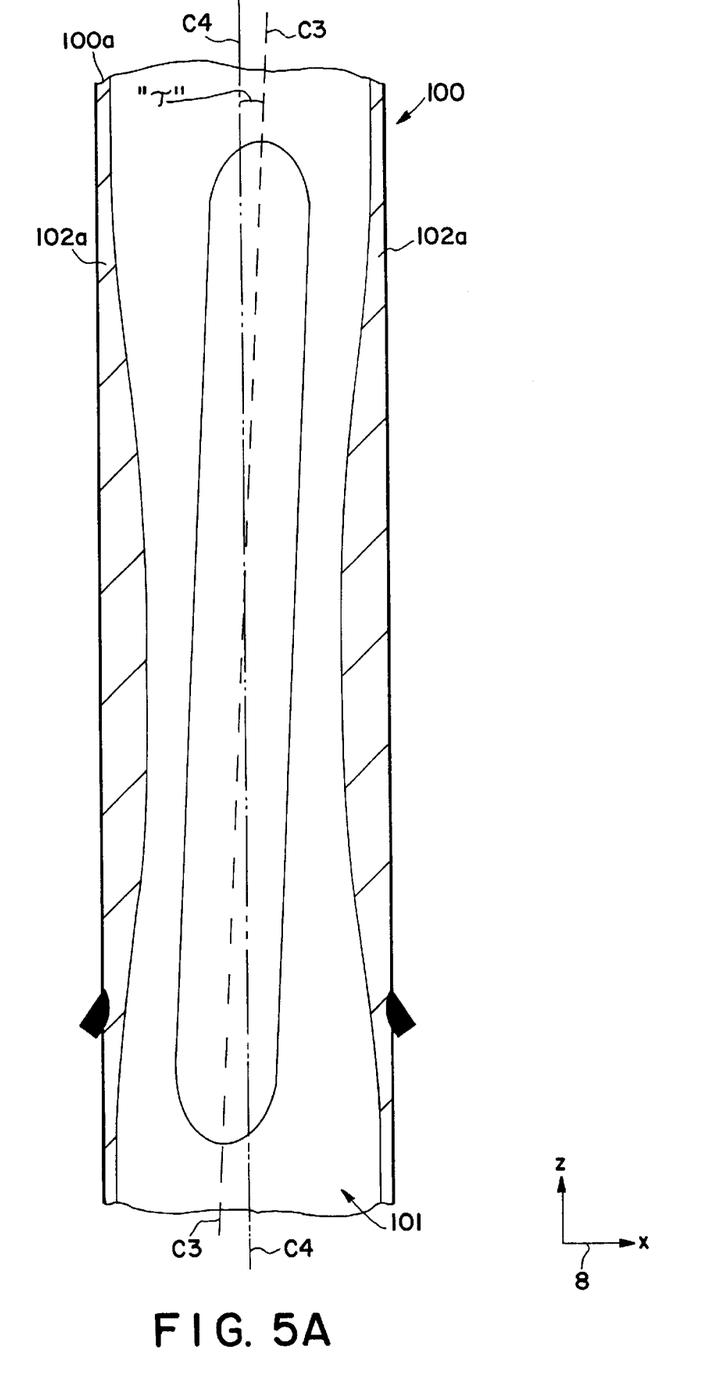
FIG. 5A illustrates a longitudinal cross-section of a first alternative embodiment of the riser shown in FIGS. 1 through 3.

FIG. 5A illustrates another possible variation within the contemplated scope of the invention. FIG. 5A shows a riser 100. The riser 100 defines a central passage 101. A plurality of mixing ribs 102a are disposed on an inner surface 100a of the riser 100. The mixing ribs 102a are positioned so that a longitudinal axis C3 of each rib 102a is oriented at an oblique angle τ in relation to a longitudinal axis C4 of the riser 100 (the riser 100, the central passage 101, and the mixing ribs 102a are otherwise substantially identical to the riser 16, the central passage 17, and the mixing ribs 29, respectively).

Figure 5B:
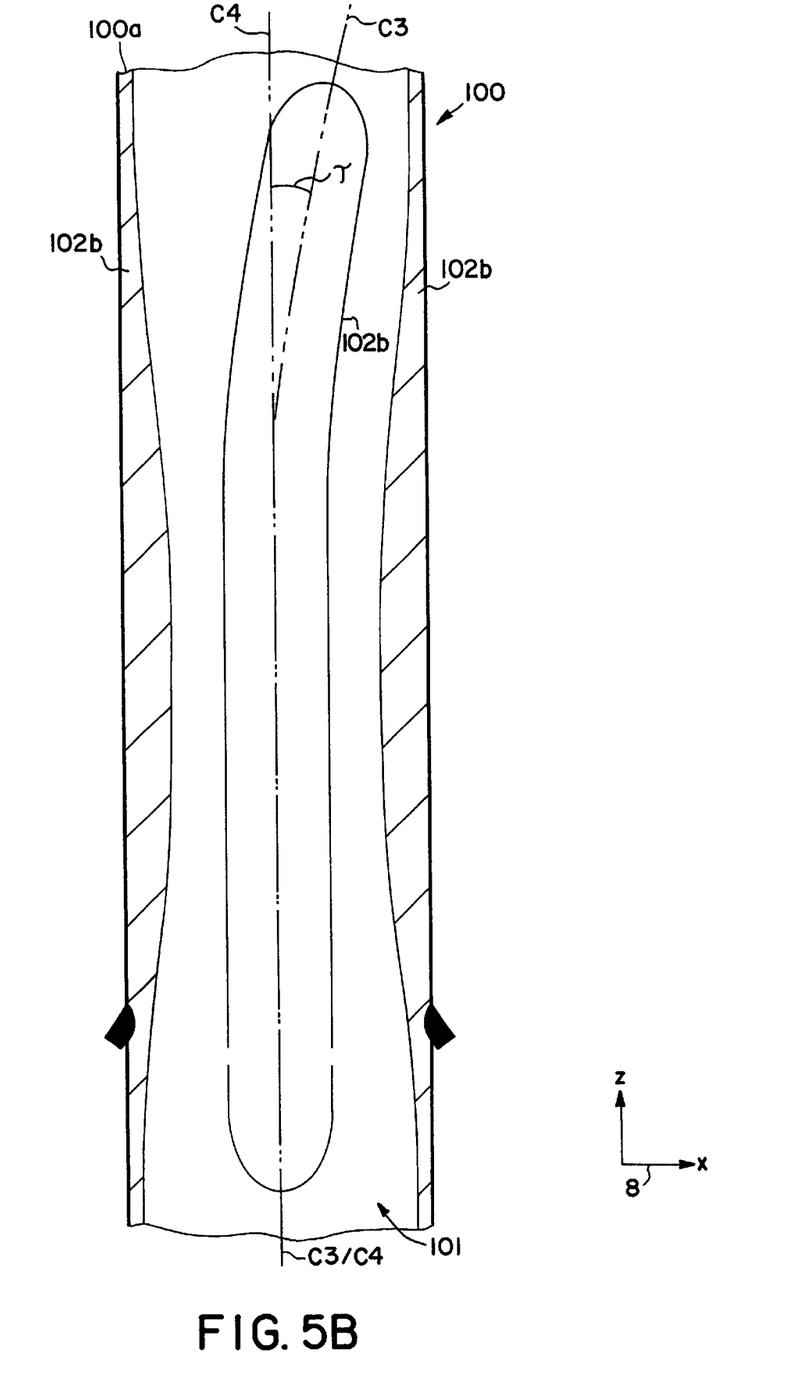
FIG. 5B illustrates a longitudinal cross-section of a second alternative embodiment of the riser shown in FIGS. 1 through 3.

The angled orientation of the ribs 102 induces a swirling motion in the flow within the central passage 101. This swirling motion potentially increases the amount of catalyst flow that is urged inward, toward the center of the passage 101. In particular, the swirling motion tends to induce unmixed catalyst away from the inner surface 100a, and toward the hydrocarbon-rich center of the passage 101. Alternatively, ribs 102b may be used in place of the ribs 102a, as shown in FIG. 5B. The ribs 102b are angled in relation to the longitudinal axis C4 of the riser 100 at their upper ends only. In other words, the lower portions of the ribs 102b extend substantially parallel to the longitudinal axis C4, while the upper portions of the ribs 102b extend at the oblique angle r in relation to the axis C4.

Figure 6:
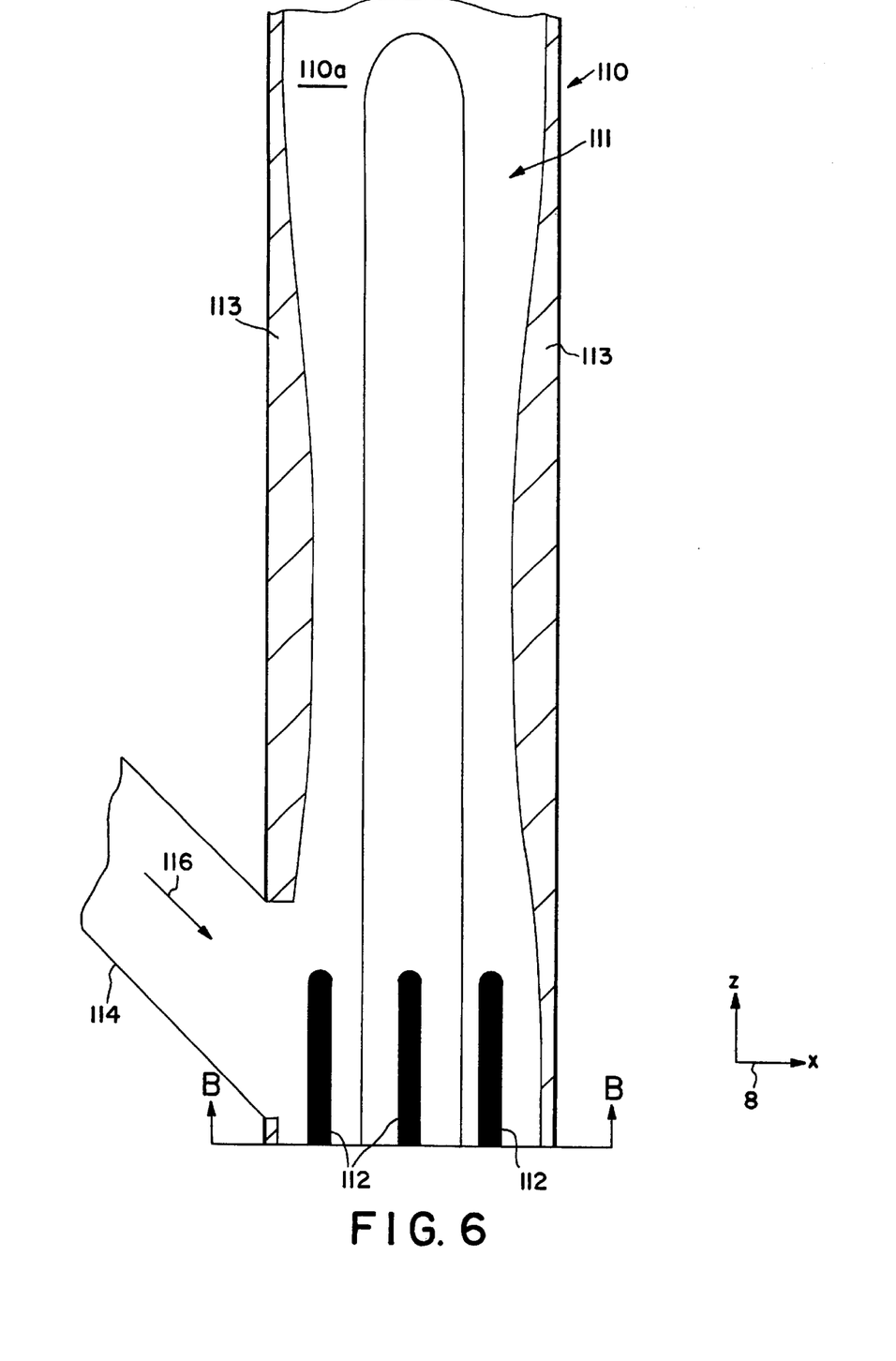
FIG. 6 illustrates a longitudinal cross-section of a third alternative embodiment of the riser shown in FIGS. 1 through 3.
Figure 7:
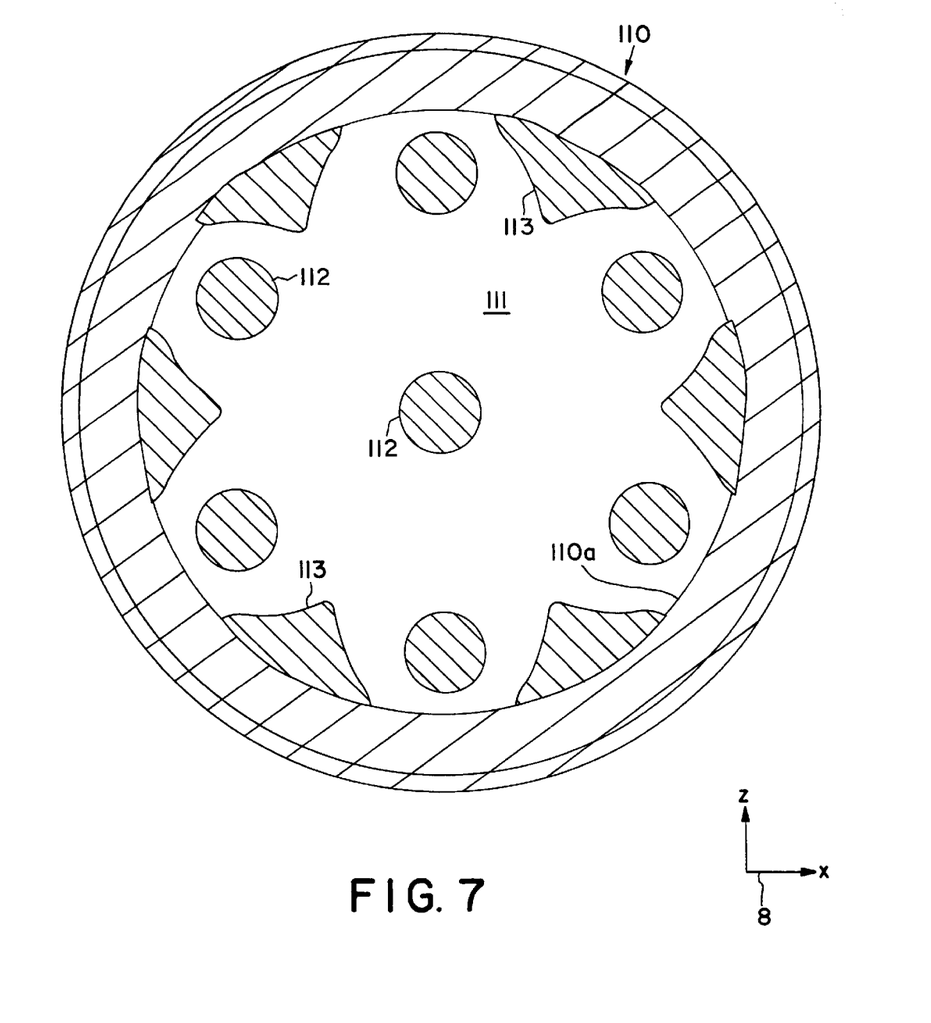
FIG. 7 illustrates a transverse cross-section of the riser shown in FIG. 6 taken along the line B—B of FIG. 6.

FIGS. 6 and 7 illustrate a further variation within the contemplated scope of the invention. FIGS. 6 and 7 depict a riser 110. The riser 110 defies a central passage 111. Regenerated catalyst enters the central passage 111 by way of a line 114, as indicated by the arrow 116. The riser 110 includes a plurality of axial-feed atomizing nozzles 112 positioned within the central passage 111. A plurality of mixing ribs 113 are disposed on an inner surface 110a of the riser 110 (the riser 110 and the central passage 111 are otherwise substantially identical to the riser 16 and the central passage 17, respectively, of the exemplary embodiment). Axial-feed nozzles such as the nozzles 112 are commonly mounted on wye-shaped riser bases (not shown). The nozzles 112 and the corresponding bases are positioned entirely within the central passage 111.

The noted mounting arrangement for the nozzles 112 inhibits complete mixing of the catalyst and the hydrocarbon feedstock within the central passage 111. In particular, the flow of the catalyst over the nozzles 112 and the corresponding nozzle bases discourages catalyst-hydrocarbon mixing directly downstream of the nozzles 112. This disadvantage can be reduced by the use of the mixing ribs 113. Specifically, the mixing ribs 113 can be utilized to force a portion of the catalyst flow into the areas directly downstream of the nozzles 112.

What is claimed is:

1. A fluidized catalytic cracking system, comprising:
   a riser having an outer surface and an inner surface, the inner surface defining a central passage extending substantially along a longitudinal axis of the riser for transporting a hydrocarbon feedstock and a catalytic material, the inner surface having a plurality of elongated ribs disposed thereon for mixing the hydrocarbon feedstock and the catalytic material, the ribs having an inner wall that faces the central passage, the ribs having a thickness defined by a distance between the inner wall and the outer surface of the riser, the thickness varying along at least a portion of the length of the ribs, wherein said central passage includes a lift zone located proximate the bottom of the riser, a feed-injection zone downstream and adjoining said lift zone, and a reaction zone downstream and adjoining said feed-injection zone, wherein a plurality of atomizing nozzles is coupled to the riser, the atomizing nozzles being adapted to inject the hydrocarbon feedstock into a flow of the catalytic material within the central passage so that the atomizing nozzles form a spray pattern of the hydrocarbon feedstock within the central passage, and wherein each of the plurality of elongated ribs is disposed within the feed injection zone of said riser between adjacent atomizing nozzles.

2. The fluidized catalytic cracking system of claim 1, wherein the inner wall of the rib forms a portion of the inner surface of the riser.

3. The fluidized catalytic cracking system of claim 1, wherein at least a portion of the rib is located within a gap in the spray pattern.

4. The fluidized catalytic cracking system of claim 1, wherein the thickness of a first portion of the rib increases along a direction of flow within the central passage.

5. The fluidized catalytic cracking system of claim 4, wherein the thickness of a second portion of the rib decreases along a direction of flow within the central passage.

6. The fluidized catalytic cracking system of claim 5, wherein the first portion of the rib is located upstream of the second portion.

7. The fluidized catalytic cracking system of claim 6, wherein the first portion of the rib adjoins the second portion.

8. The fluidized catalytic cracking system of claim 1, wherein the atomizing nozzles are radial-feed nozzles.

9. The fluidized catalytic cracking system of claim 1, wherein the atomizing nozzles are axial-feed nozzles.

10. The fluidized catalytic cracking system of claim 1, wherein a transverse cross section of the rib inner wall has a substantially arcuate-shaped profile.

11. The fluidized catalytic cracking system of claim 1, wherein a longitudinal axis of the rib is substantially parallel to the longitudinal axis of the riser.

12. The fluidized catalytic cracking system of claim 1, wherein at least a portion of a longitudinal axis of the rib is oblique to the longitudinal axis of the riser.

13. The fluidized catalytic cracking system of claim 1, wherein the rib inner wall includes a first inclined portion, a first concave portion adjoining the first inclined portion, and a convex portion adjoining the first concave portion.

14. The fluidized catalytic cracking system of claim 13, wherein the rib inner wall further includes a second concave portion adjoining the convex portion, and a second inclined portion adjoining the second concave portion.

15. The fluidized catalytic cracking system of claim 14, wherein where a radius of curvature of the first concave portion is less than a radius of curvature of the second concave portion.

16. The fluidized catalytic cracking system of claim 1, wherein the atomizing nozzles are spaced apart along a circumference of the riser inner surface and at least a portion of the rib is disposed between a first and an adjacent second of the atomizing nozzles.

17. The fluidized catalytic cracking system of claim 1, wherein the riser includes an out-wall and a liner anchored to the out-wall, the liner forming the inner surface of the riser.

18. The fluidized catalytic cracking system of claim 17, wherein the liner is formed from a refractory material.

19. A fluidized catalytic cracking system, comprising:
   a riser having an outer surface and an inner surface, the inner surface defining a central passage extending substantially along a longitudinal axis of the riser wherein said central passage includes a lift zone located proximate the bottom of the riser, a feed-injection zone downstream and adjoining said lift zone, and a reaction zone downstream and adjoining said feed-injection zone;
   a plurality of atomizing nozzles coupled to the riser, the atomizing nozzles being adapted to inject a hydrocarbon feedstock into a flow of catalytic material within the central passage so that the atomizing nozzles form a spray pattern of the hydrocarbon feedstock within the central passage; and
   a plurality of elongated ribs disposed along the riser inner surface within the feed injection zone of said riser, wherein the number of elongated ribs is equal to the number of atomizing nozzles and each of said elongated ribs is located between adjacent atomizing nozzles.

20. The fluidized catalytic cracking system of claim 19, wherein the atomizing nozzles are spaced apart along a circumference of the riser inner surface and at least a portion of each rib is disposed between adjacent atomizing nozzles.

21. The fluidized catalytic cracking system of claim 19, wherein each of the elongated ribs includes an inner wall that faces the central passage, a first portion of the inner wall being curved inward toward the longitudinal axis of the riser so that a portion of the flow of catalytic material is directed toward the longitudinal axis.

22. The fluidized catalytic cracking system of claim 21, wherein the inner wall of the rib forms a portion of the inner surface of the riser.

23. The fluidized catalytic cracking system of claim 21, wherein a second portion of the rib inner wall is curved outward away from the longitudinal axis of the riser.

24. The fluidized catalytic cracking system of claim 23, wherein the first portion of the rib inner wall is located upstream of the second portion.

25. The fluidized catalytic cracking system of claim 19, wherein at least a portion of each rib is located within a gap in the spray pattern.

26. The fluidized catalytic cracking system of claim 19, wherein a longitudinal axis of each rib is substantially parallel to the longitudinal axis of the riser.

27. The fluidized catalytic cracking system of claim 19, wherein at least a portion of a longitudinal axis of each rib is oblique to the longitudinal axis of the riser.

28. The fluidized catalytic cracking system of claim 19, wherein the atomizing nozzles are radial-feed nozzles.

29. The fluidized catalytic cracking system of claim 19, wherein the atomizing nozzles are axial-feed nozzles.

30. The fluidized catalytic cracking system of claim 21, wherein a transverse cross section the inner wall of each rib has a substantially arcuate-shaped profile.

31. The fluidized catalytic cracking system of claim 21, wherein the inner wall of each rib includes a first inclined portion, a first concave portion adjoining the first inclined portion, and a convex portion adjoining the first concave portion.

32. The fluidized catalytic cracking system of claim 31, wherein the inner wall of each rib further includes a second concave portion adjoining the convex portion, and a second inclined portion adjoining the second concave portion.

33. The fluidized catalytic cracking system of claim 32, wherein where a radius of curvature of the first concave portion is less than a radius of curvature of the second concave portion.

34. The fluidized catalytic cracking system of claim 31, wherein the atomizing nozzles are spaced apart along a circumference of the riser inner surface and the first concave portion of each rib inner wall is disposed between adjacent atomizing nozzles.

35. The fluidized catalytic cracking system of claim 19, wherein the riser includes an out-wall and a liner anchored to the out-wall, the liner forming the inner surface of the riser.

36. A fluidized catalytic cracking system, comprising:
   a riser having an outer surface and an inner surface, the inner surface defining a central passage extending substantially along a longitudinal axis of the riser for transporting a hydrocarbon feedstock and a catalytic material wherein said central passage includes a lift zone located proximate the bottom of the riser, a feed-injection zone downstream and adjoining said lift zone, and a reaction zone downstream and adjoining said feed-injection zone;
   a plurality of atomizing nozzles coupled to the riser, the atomizing nozzles being adapted to inject the hydrocarbon feedstock into a flow of the catalytic material within the central passage so that the atomizing nozzles form a spray pattern of the hydrocarbon feedstock within the central passage;
   a plurality of elongated ribs disposed along the inner surface of the feed injection zone of said riser for mixing the hydrocarbon feedstock and the catalytic material, the ribs being contoured so that a radial distance between the ribs and the longitudinal axis of the riser varies along at least a portion of a length of the ribs, wherein the number of ribs is equal to the number of atomizing nozzles and each of said ribs is located between adjacent atomizing nozzles.

37. The fluidized catalytic cracking system of claim 36, wherein the atomizing nozzles are spaced apart along a circumference of the riser inner surface and at least a portion of the rib is disposed between a first and an adjacent second of the atomizing nozzles.

38. The fluidized catalytic cracking system of claim 36, wherein the rib includes an inner wall, a first portion of the rib inner wall being curved in relation to the longitudinal axis of the riser so that a radial distance between the first portion of the inner wall and the longitudinal axis of the riser decreases along a direction of flow within the central passage.

39. The fluidized catalytic cracking system of claim 38, wherein a second portion of the rib inner wall is curved in relation to the longitudinal axis of the riser so that a radial distance between the second portion of the inner wall and the longitudinal axis of the riser increases along the direction of flow within the central passage.

40. The fluidized catalytic cracking system of claim 39, wherein the first portion of the rib inner wall is located upstream of the second portion.

41. The fluidized catalytic cracking system of claim 39, wherein where a radius of curvature of the first portion of the rib inner wall is less than a radius of curvature of the second portion of the rib inner wall.

42. The fluidized catalytic cracking system of claim 36, wherein at least a portion of the rib is located within a gap between the spray pattern and the inner surface of the riser.

43. The fluidized catalytic cracking system of claim 38, wherein a transverse cross section of the rib inner wall has a substantially arcuate-shaped profile.

44. The fluidized catalytic cracking system of claim 36, wherein a longitudinal axis of the rib is substantially parallel to the longitudinal axis of the riser.

45. The fluidized catalytic cracking system of claim 36, wherein at least a portion of a longitudinal axis of the rib is oblique to the longitudinal axis of the riser.

46. The fluidized catalytic cracking system of claim 36, wherein the atomizing nozzles are radial-feed nozzles.

47. The fluidized catalytic cracking system of claim 36, wherein the atomizing nozzles are axial-feed nozzles.

48. The fluidized catalytic cracking system of claim 38, wherein the atomizing nozzles are spaced apart along a circumference of the riser inner surface and the first portion of the rib is disposed between a first and an adjacent second of the atomizing nozzles.

49. The fluidized catalytic cracking system of claim 36, wherein the riser includes an out-wall and a liner anchored to the out-wall, the liner forming the inner surface of the riser.

50. The fluidized catalytic cracking system of claim 40, wherein a radius of curvature of the first portion of the rib inner wall is greater than a radius of curvature of the second portion of the rib inner wall.

51. The fluidized catalytic cracking system of claim 38, wherein the inner wall of the rib forms a portion of the inner surface of the riser.

* * * * *